(No Model.)
I. & M. A. HODGSON.
GEOGRAPHICAL GLOBE.
No. 519,061. Patented May 1, 1894.
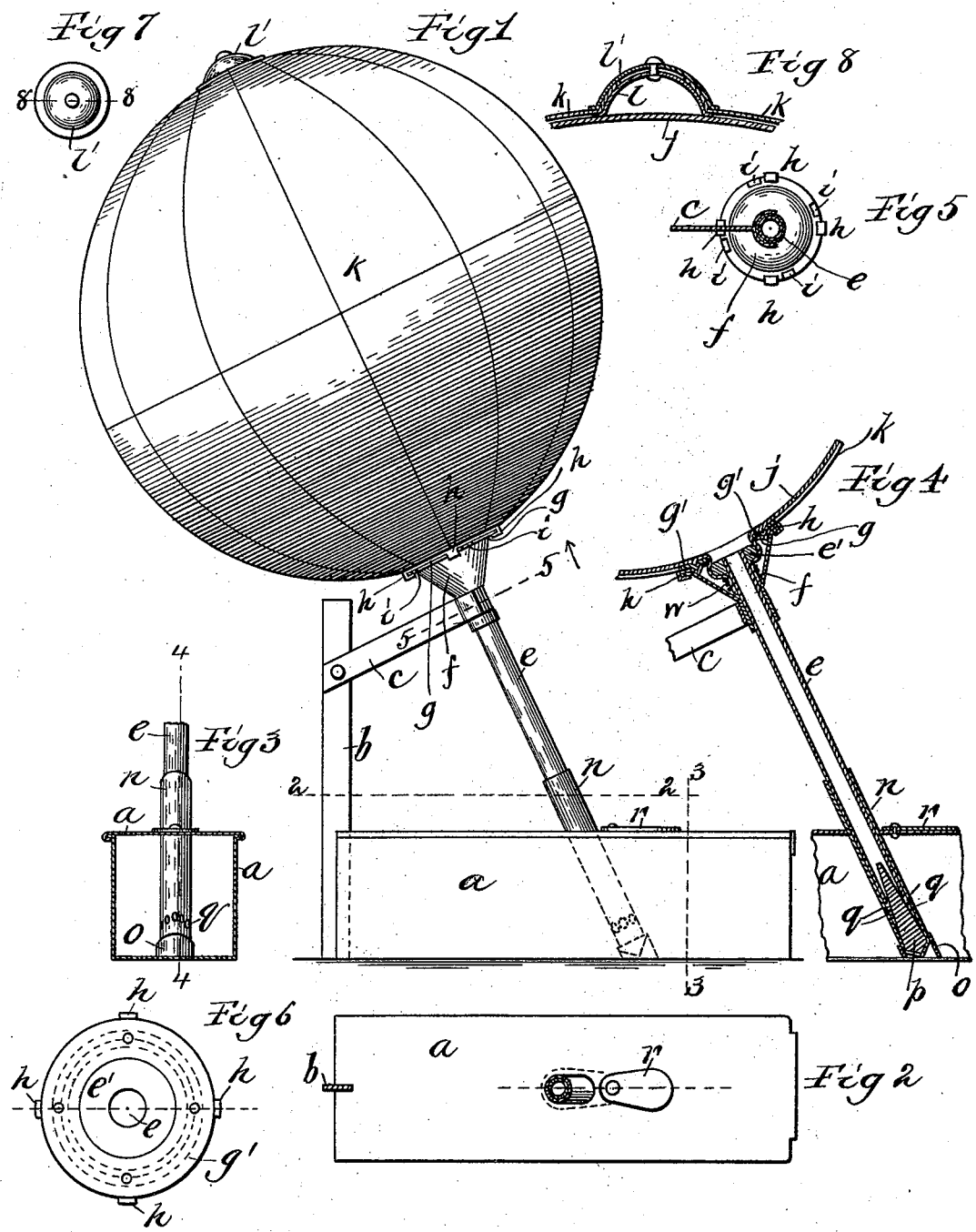
WITNESSES
A. Helmich
R. C. Page
INVENTORS
Isaac Hodgson
Mary Ann Hodgson
By Coburn & Thacher
Attys.

UNITED STATES PATENT OFFICE.

ISAAC HODGSON AND MARY ANN HODGSON, OF CHICAGO, ILLINOIS.

GEOGRAPHICAL GLOBE.

SPECIFICATION forming part of Letters Patent No. 519,061, dated May 1, 1894.

Application filed February 19, 1894. Serial No. 500,723. (No model.)

*To all whom it may concern:*

Be it known that we, ISAAC HODGSON and MARY ANN HODGSON, citizens of the United States, residing at Chicago, in the county of Cook and State of Illinois, have invented a certain new and useful Improvement in Geographical Globes, which is fully set forth in the following specification, reference being had to the accompanying drawings, in which—

Figure 1 is a side elevation of our apparatus in position for use. Fig. 2 is a transverse, sectional view, taken at the line 2—2, Fig. 1. Fig. 3 is a vertical sectional view, taken at the line 3—3, Fig. 1. Fig. 4, is a central, sectional view, taken at the line 4—4, Fig. 3, showing the upper end of the air-tube and its attachments not cut away. Fig. 5 is a transverse, sectional view, taken at the line 5—5, Fig. 1, looking upward. Fig. 6 is a top or plan view of clamping devices attached to the air-tube. Fig. 7 is a top or plan view of the clamping-device which represents the north pole; and Fig. 8 is a sectional view, taken at the line 8—8, Fig. 7, showing a portion of the cloth globe clamped therein.

Our invention relates to that class of inflatable and collapsible geographical globes such as shown and described in our Letters Patent No. 488,071, issued to us December 13, 1892.

We find that it is very desirable and useful to make two spheres or globes, one of which is attached to the air-tube and is made air-tight, which we preferably make of india-rubber; and an exterior globe or sphere made of cloth or suitable material to be used as a slate or black-board on which may be drawn a representation of the geography of the world and erased therefrom. It is important that this exterior globe should be so constructed that it can be removed from and attached to the apparatus so that it can be readily replaced when worn. It is also important to make a stand which can be used in connection with such an inflatable globe for holding it in position, and which will serve as a box to hold the globe when collapsed as well as the material to be used in connection therewith.

To enable others skilled in the art to understand how to make and use our invention, we describe the same with particularity, using in doing so the same letters of reference to indicate the same parts in the different figures of the drawings.

In the accompanying drawings, $a$ represents a box provided with a sliding lid having a hole through it large enough for the tubular stem of the apparatus to pass, as clearly shown in Figs. 1 and 4. At one end of this box there is attached an upright piece, $b$. I have shown in the drawings the lower end of this upright piece $b$ to be bifurcated or forked and slipping into the end-piece of the box $a$. It is also held in place partly by the cover $a$ as clearly shown in Fig. 2. There is pivoted to the upper end of this upright piece $b$ an arm, $c$, which is also bifurcated or forked so as to receive and support the stem $e$ of the inflatable globe. The hollow stem $e$ of the inflatable globe has firmly secured to it a supporting-piece, $f$, which has in its upper edge several notches, $i$. There are two clamping-rings, $g$ and $g'$, between which the edge of the cloth of the exterior globe is clamped; the ring $g$ being provided with clamping-hooks, $h$, which, when they register with the notches $i$, will pass through them, and, by turning them slightly, as clearly shown in Fig. 5, these clamps are attached firmly to the annular piece $f$, thereby securing the exterior globe to the air-tube or hollow stem $e$ of the apparatus.

$j'$, represents the interior or rubber globe, and it is secured to the hollow stem $e$ by means of the cord or wire, $w$.

$e'$, is rigidly attached to the end of the air-tube $e$ and constitutes a head under which the edges of the rubber globe are secured by the cord or wire $w$ to attach the rubber globe to the hollow stem or air tube $e$.

We find that in order to cause the exterior globe to assume its proper place on the interior inflating globe when inflated so that the meridian lines will take their correct relative position, it is important to put into the exterior globe a clamping device in the position of the north pole. This clamping device is shown in Figs. 7 and 8, and consists of two metallic plates, $l\ l'$, with the edge of the cloth globe $k$ between them.

$o$, is a socket in the bottom of the box $a$ in which the lower end of the stem rests when the apparatus is in position for use.

$n$, is a tube into which the lower end of the stem or air-tube $e$ slides. There are small holes, $q$, through the tube $n$ and the lower end of the hollow stem or air-tube $e$, which are so arranged relatively to each other that when the tube $n$ is adjusted, these holes register and air will freely pass into the air-tube $e$, and when the two parts are adjusted so that the holes will not register, the air is retained in the globe.

$p$, is a plug, preferably made of rubber, for closing the lower end of the tube $n$ as well as regulating the admission of air to the air-tube $e$.

$r$, is a pivoted cover for covering the opening in the top of the box $a$ when the apparatus is not in use.

In making the exterior inflatable globe, we prepare the cloth, or other material of which it is made, by using such material in painting, or otherwise, that it will be of a solid color which will show the meridian and other like stable lines, and also be susceptible of receiving chalk or crayon marks and not be destroyed when they are erased.

One of the purposes of this invention is to make a collapsible and inflatable globe which can be readily placed in position and used by a child or student as a blackboard on which can be drawn representations of the geographical features of the world, and easily erased therefrom, and at the same time have our apparatus so constructed that when the exterior globe which is used as a blackboard has become somewhat worn or injured in use, it can be removed and replaced by a new one without injuring the other parts of the apparatus.

Having fully described the construction and operation of our invention, what we claim as new, and desire to secure by Letters Patent, is—

1. A geographical flexible globe being provided with clamping devices at the points indicating the two poles; an air-stem or tube; and mechanism by which one of these clamping devices of the globe are detachably connected to the air-tube or stem, substantially as specified.

2. In a flexible geographical globe apparatus, the air-stem or tube through which the globe is inflated; two inflatable and collapsible globes attached to said tubes, the interior one being permanently secured thereto, the other one detachably secured thereto, by means of clamp-devices, substantially as specified.

3. In a geographical globe apparatus, the exterior globe $k$, provided at the points of the poles with clamping-devices inserted in the globes; an interior inflatable globe $j$; the hollow-air-tube or stem $e$; locking-devices for locking the clamps of the exterior globe to the stem or air-tube $e$, whereby when the interior globe is inflated the two poles of the exterior globe with the meridian lines thereon, will assume their proper relative position to represent the geography of the world.

4. In a collapsible geographical globe apparatus, the box $a$ adapted to receive the stem of the globe and hold it in position; the upright piece attached to the box and bifurcated arm pivoted to the upright piece for supporting the stem of the globe, substantially as specified.

5. The stem $e$ of the geographical globe; the tube $n$; the openings $g$ and plug-stopper $p$ whereby the operator can adjust these parts and inflate the globe and by readjustment immediately retain the air in the globe, substantially as specified.

ISAAC HODGSON.
MARY ANN HODGSON.

Witnesses:
ALOYSIA HELMICH,
W. C. CORLIES.